March 13, 1962 J. L. SARZIN ET AL 3,025,470

PULSE POSITION DEMODULATOR

Filed Jan. 15, 1958

INVENTORS
JULIUS L. SARZIN
ERWIN S. TELTSCHER
IRWIN STEINBERG
LLOYD WEISMAN

BY Victor D. Borst

ATTORNEY.

United States Patent Office 3,025,470

Patented Mar. 13, 1962

3,025,470

PULSE POSITION DEMODULATOR

Julius L. Sarzin, Brooklyn, Erwin Teltscher, Forest Hills, Irwin Steinberg, Bronx, and Lloyd Weisman, Flushing, N.Y., assignors to Sperry Rand Corporation, Ford Instrument Company Division, Long Island City, N.Y., a corporation of Delaware Filed Jan. 15, 1958, Ser. No. 709,123

4 Claims. (Cl. 329—107)

This invention relates to demodulating circuits and particularly to demodulators designed to extract information from frequencies which have been pulse position modulated.

An established method of pulse position demodulation is to provide a bistable multivibrator to convert the input pulses to a binary gate pulse whose width is proportional to the spacing between the input pulses. This gate is then used to generate a voltage sweep, the peak amplitude of which is proportional to the duration of the gate. In conventional units subsequent memory circuitry is required to clamp this peak and present it to read out and recording devices as the analog of the original data.

According to this invention, a voltage sweep generator, a memory circuit and discharge circuit are combined in a single unit, thus achieving a compactness and minimization of control which are desirable characteristics for electronic instruments generally. More particularly, the demodulator employs an electronic switch driven by a square pulse producing device which is operative according to the displacement between input pulses. The device causes a circuit to generate a voltage sweep the voltage peak of which is controlled by the duration of the square pulse. By virtue of a special circuit expedient this peak voltage is maintained until discharged by a discharge trigger, thereby allowing the building up of a new peak voltage during the next sequence of pulses. Thus the necessity for providing the usual additional units including voltage clamping and recording devices are eliminated.

A more complete understanding of the invention may be gained from the following detailed description which is taken in conjunction with the drawings, in which FIG. 1 is a block diagram showing the complete arrangement of the pulse position demodulator;

Figure 1:
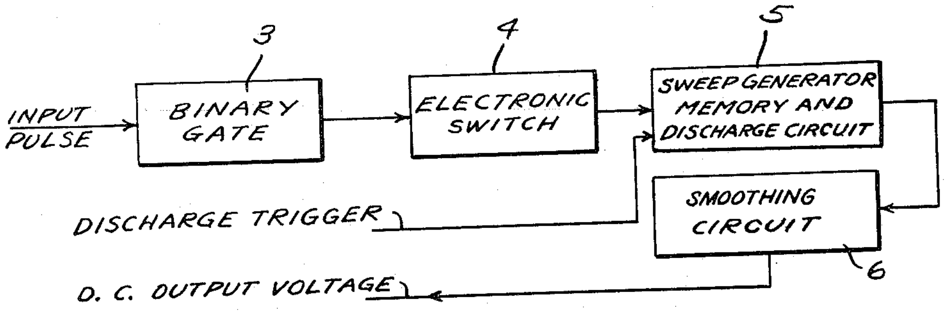
Figure 3:
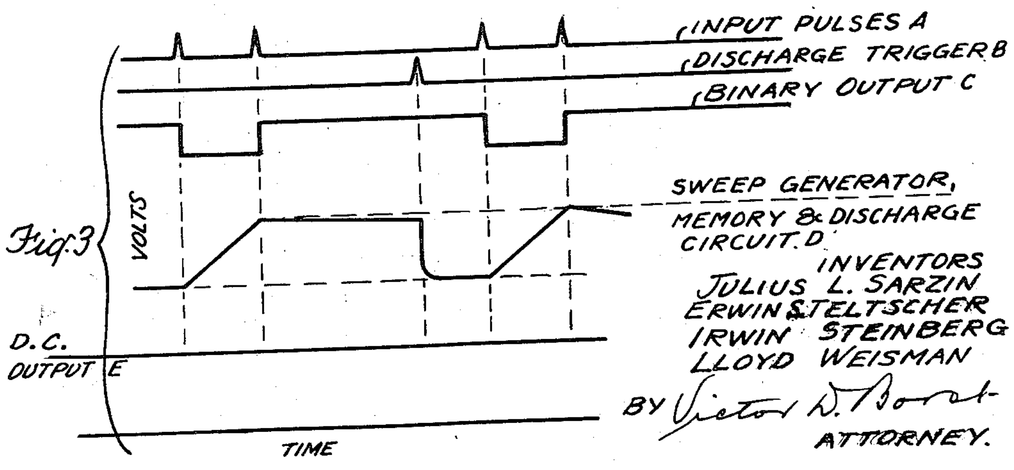
FIG. 3 is a diagram illustrating the relation of the input pulses to the D.C. output voltage.

Referring to FIG. 1, a binary gate 3 is adapted to receive input pulses, as shown in wave form A of FIG. 3, which have been displaced according to the impressed intelligence during modulation. The binary gate may comprise a conventional two state device, such as a bistable multivibrator, which changes state with each pulse and requires two pulses to complete a full cycle. The output of the binary gate is fed to an electronic switch 4 which operates the sweep generator, memory and discharge circuit 5. The output from said circuit 5 is fed to a smoothing circuit 6 whereby the D.C. output voltage of the circuit 6 is an analog of the modulated input pulse position information. The D.C. output is maintained substantially in a steady state until discharged by the discharge trigger and can therefore, be used directly to indicate the analog after passing through the smoothing circuitry 6, in view of the special means for controlling the condenser charge and discharge time constants in the sweep generator circuit. This circuit is described as follows. It is understood, of course, that the vacuum tubes may be replaced by equivalent transistor circuits.

Figure 2:
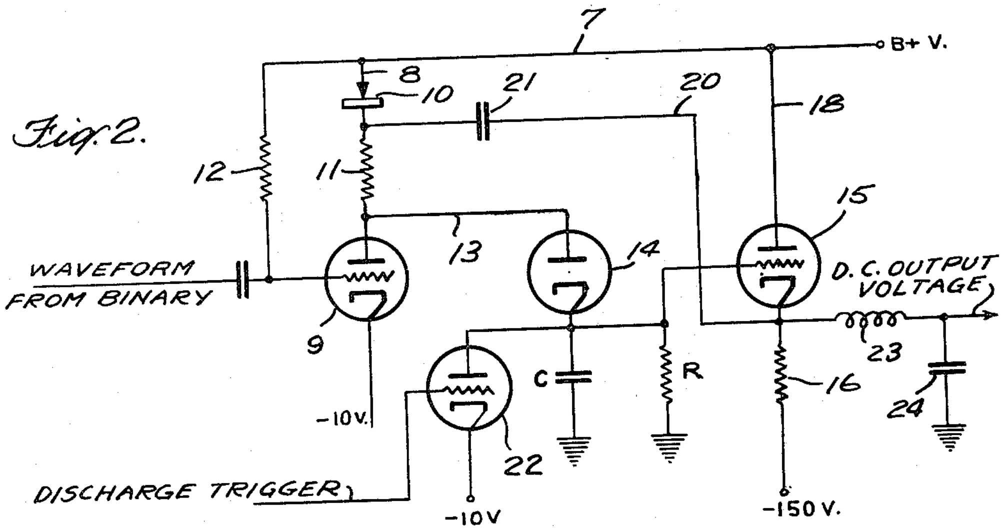
FIG. 2 is a schematic diagram of the demodulator.

As shown in FIG. 1, the electronic switch 4 is connected to receive negative square gate pulses from the binary gate 3 such as those shown in wave form C of FIG. 3 and as shown in FIG. 2, comprises a triode 9 whose plate is biased by the two hundred volt line 7 and plate lead 8 which includes a half wave rectifier 10 and a plate resistor 11. The line 7 has a resistor 12 connected to the grid of the triode 9 which receives the modulated signal from the gate.

An output lead 13 connects the plate of the triode 9 to the plate of a diode 14. The cathode of the diode 14 is connected to the grid of a second triode 15, the plate of the third triode 22 and across an RC network. The RC network includes a grounded capacitor C and grounded resistor R in parallel. The function of the triode 22 is to discharge the voltage across the RC network just before the application of another negative going gate binary from the binary, thereby allowing the output voltage level across the RC network to translate the pulse position information as rapidly as possible and allowing the output voltage linearity to be maintained over the range of pulse position variations. A discharge trigger pulse appearing on the grid of the triode 22 is indicated as wave form B in FIG. 3.

The grid of triode 22 is connected to a discharge trigger and the cathode of triode 22 is connected to a small negative voltage source. A cathode resistor 16 is disposed between the cathode of the triode 15 and a large negative voltage. A lead 18 connects the plate of triode 15 to the B+ voltage line 7. The cathode of the triode 15 is connected to the junction of diode 10 and resistor 11 by lead 20 through condenser 21, and to choke 23 which is series connected to capacitor 24, capacitor 24 being connected to ground at its other end. The output voltage across cathode resistor 16 is made to pass through the choke 23 and capacitor 24 for smoothing the pulse form. The D.C. output voltage being taken from the junction of choke 23 and capacitor 24 and shown as wave form E in FIG. 3.

The operation of the sweep generator and memory circuit is basically as follows: The negative pulse, as shown in FIG. 3 (wave form C), from the binary cuts off the electronic switch 4 and initiates a sweep voltage across the capacitor C in a manner similar to that in a conventional bootstrap circuit (note that the diode 14 is conducting and thus will not affect the operation of the circuit). However, at the termination of the sweep the presence of the diode 14 will prevent the normally rapid discharge of the capacitor C thru the conventional path and instead constrains the discharge time constant to be RC. In this manner, the discharge time constant can be made very long and, as shown by wave form D in FIG. 3, it is thus possible to maintain within a few percent, the peak level of the voltage sweep over any reasonable time duration, until discharged by triode 22. The complete independence of the charge and discharge time constants is thus established. The former, which governs the operation of the voltage sweep circuit, will normally be quite small so that an appreciable amplitude of voltage is developed. The latter will generally be quite large so that the output voltage will be the desired D.C. analog of the input pulse position modulated information.

Various modifications may be made in the embodiment as shown and described without departing from the scope of invention as defined in the appended claims.

What is claimed is:

1. A pulse position demodulator comprising a bistable multivibrator device, an electronic switch connected to receive the output of said device, and a rapid charge and slow discharge circuit, said circuit comprising a diode rectifier, one side of which is connected to said switch, a resistance-capacitance network connected to the other side of said rectifier and a smoothing circuit connected to the output side of said network, said diode rectifier being poled in the direction of said network, whereby the discharge from said network through said switch is precluded, thereby causing its normal rate of discharge to be substantially less than its rate of charge and enabling peak voltages in the output of the resistance-capacitance network to be closely maintained for a relatively large time duration, and means also connected to the output side of said network for rapidly discharging said network so that new demodulated, peak voltages may be developed across said network by said switch and represented in the output of said smoothing circuit.

2. A pulse position demodulator comprising a bistable multivibrator device, a three element vacuum tube switch having a half wave rectifier in its plate circuit, said switch being connected to receive the output of said device and a rapid charge and slow discharge circuit, said circuit comprising a diode rectifier, one side of which is connected to said switch, a resistance-capacitance network connected to the other side of said rectifier and a smoothing circuit connected to the output side of said network, said smoothing circuit being coupled to a point in the plate circuit of the vacuum tube switch disposed between said half wave rectifier and the plate electrode of said vacuum tube switch, said diode rectifier being poled in the direction of said network, whereby the discharge from said network through said switch is precluded, thereby causing its normal rate of discharge to be substantially less than its rate of charge and enabling peak voltages in the output of the resistance-capacitance network to be closely maintained for a relatively large time duration, and means also connected to the output side of said network for rapidly discharging said network so that new demodulated, peak voltages may be developed across said network by said switch and represented in the output of said smoothing circuit.

3. A pulse position demodulator as claimed in claim 2 wherein said means for rapidly discharging said network include a triode, the plate of said triode being connected between the said other side of said rectifier and the grid of said triode being adapted to receive periodic trigger pulses for the rapid discharge of said network.

4. A pulse position demodulator as claimed in claim 3 wherein said smoothing circuit comprises a cathode follower, the coupling connection form the plate circuit of said vacuum tube switch being connected to the cathode electrode of said follower, and a series connected choke and capacitor for receiving the output of said follower and being also connected to the cathode electrode thereof.

References Cited in the file of this patent

UNITED STATES PATENTS

| | | |
|---|---|---|
| 2,447,507 | Kenyon | Aug. 24, 1948 |
| 2,466,705 | Hoeppner | Apr. 12, 1949 |
| 2,500,536 | Goldberg | Mar. 14, 1950 |
| 2,560,600 | Schafer | July 17, 1951 |
| 2,594,276 | Barker et al. | Apr. 29, 1952 |
| 2,719,225 | Morris | Sept. 27, 1955 |
| 2,812,435 | Lyon | Nov. 5, 1957 |
| 2,931,983 | Blake | Apr. 5, 1960 |